United States Patent
Karczewicz et al.

(10) Patent No.: US 9,538,175 B2
(45) Date of Patent: Jan. 3, 2017

(54) CONTEXT DERIVATION FOR CONTEXT-ADAPTIVE, MULTI-LEVEL SIGNIFICANCE CODING

(71) Applicant: QUALCOMM Incorporated, San Diego, CA (US)

(72) Inventors: Marta Karczewicz, San Diego, CA (US); Joel Sole Rojals, La Jolla, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/037,159

(22) Filed: Sep. 25, 2013

(65) Prior Publication Data

US 2014/0086307 A1    Mar. 27, 2014

Related U.S. Application Data

(60) Provisional application No. 61/706,035, filed on Sep. 26, 2012.

(51) Int. Cl.
*H04N 19/463* (2014.01)
*H04N 19/18* (2014.01)
(Continued)

(52) U.S. Cl.
CPC ...... *H04N 19/00296* (2013.01); *H04N 19/463* (2014.11); *H04N 19/70* (2014.11);
(Continued)

(58) Field of Classification Search
None
See application file for complete search history.

(56) References Cited

U.S. PATENT DOCUMENTS 6,680,974 B1 *   1/2004   Faryar et al. ............ 375/240.18
2006/0078049 A1 *   4/2006   Bao et al. ................ 375/240.11
(Continued)

FOREIGN PATENT DOCUMENTS

| EP | 2590409 A1 | 5/2013 |
| EP | 2595380 A1 | 5/2013 |
| WO | 2011128303 A2 | 10/2011 |

OTHER PUBLICATIONS

Davies et al., "Suggestion for a Test Model", JCT-VC Meeting, Apr. 15-23, 2010, Dresden, (Jointcollaborative Team on Video Coding of ISO/IEC JTCI/SC29/WGII and ITU-TSG.16), XP030007526, 30 pp.

(Continued)

*Primary Examiner* — Kevin McInnish
(74) *Attorney, Agent, or Firm* — Shumaker & Sieffert, P.A.

(57) ABSTRACT

A device for coding video data includes a video coder configured to code first significance information for transform coefficients associated with residual data, wherein the first significance information indicates if a first sub-block comprises at least one non-zero coefficient, wherein the first sub-block is a sub-block of an entire transform block; and, code second significance information, wherein the second significance information indicates if a second sub-block comprises at least one non-zero coefficient, wherein the second sub-block is a sub-block of the first sub-block, wherein coding the second significance information comprises performing an arithmetic coding operation on the second significance information, wherein a context for the arithmetic coding operation is determined based on one or more neighboring sub-blocks of a same size as the first sub-block.

14 Claims, 12 Drawing Sheets

(51) Int. Cl.
*H04N 19/70* (2014.01)
*H04N 19/91* (2014.01)
H04N 19/64 (2014.01)
H04N 19/61 (2014.01)
H04N 19/96 (2014.01)

(52) U.S. Cl.
CPC ............. *H04N 19/91* (2014.11); *H04N 19/18* (2014.11); *H04N 19/61* (2014.11); *H04N 19/647* (2014.11); *H04N 19/96* (2014.11)

(56) References Cited

U.S. PATENT DOCUMENTS

| | | | |
|---|---|---|---|
| 2008/0219578 A1* | 9/2008 | Lee ............................... | 382/247 |
| 2011/0310976 A1 | 12/2011 | Wang et al. | |
| 2012/0082235 A1* | 4/2012 | Lou et al. ................ | 375/240.18 |
| 2012/0155546 A1 | 6/2012 | Marpe et al. | |
| 2012/0230417 A1 | 9/2012 | Sole et al. | |
| 2012/0230419 A1 | 9/2012 | Sole et al. | |
| 2013/0101046 A1 | 4/2013 | Korodi et al. | |
| 2013/0128985 A1* | 5/2013 | He et al. .................. | 375/240.18 |
| 2013/0188688 A1 | 7/2013 | Panusopone et al. | |
| 2013/0188698 A1 | 7/2013 | Chien et al. | |
| 2013/0188724 A1* | 7/2013 | Nguyen et al. .......... | 375/240.18 |
| 2013/0188726 A1* | 7/2013 | Ji ........................ | H04N 19/176 375/240.18 |
| 2013/0195182 A1* | 8/2013 | Kung .................... | H04N 19/46 375/240.12 |
| 2013/0223521 A1 | 8/2013 | Kim et al. | |

OTHER PUBLICATIONS

International Search Report and Written Opinion—PCT/US2013/061890—ISAEPO—Dec. 5, 2013, 14 pp.
Nguyen et al: "Multi-level Significance Maps for Large Transform Units", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G644, XP030110628, 12 pp.
Nguyen et al., "Improved Context Modeling for Coding Quantized Transform Coefficients in Video Compression", Dec. 8-10, 2010, Picture Coding Symposium 2010; Nagoya, XP030082008, 4 pp.
Wiegand et al., "WD1: Working Draft 1 of High-Efficiency Video Coding," JCTVC-C403, 3rd Meeting: Guangzhou, CN, Oct. 7-15, 2010, 137 pp, sections 7.3.8, 7.3.9, 7.4.8, 7.4.9, 8.4.3, and 8.5.
Wiegand et al., "WD2: Working Draft 2 of High-Efficiency Video Coding," JCTVC-D503, 4th Meeting: Daegu, KR, Jan. 20-28, 2011, 153 pp, sections 7.3.8, 7.3.9, 7.4.8, 7.4.9, 8.4.3, and 8.5.
Wiegand et al., "WD3: Working Draft 3 of High-Efficiency Video Coding," Document JCTVC-E603, 5th Meeting: Geneva, CH, Mar. 16-23, 2011, 193 pp, sections 7.3.8, 7.3.9, 7.4.8, 7.4.9, 7.4.10, 8.4.3, and 8.5.
Bross et al., "WD4: Working Draft 4 of High-Efficiency Video Coding," 6th Meeting: JCTVC-F803_d2, Torino, IT, Jul. 14-22, 2011, 226 pp, sections 7.3.8, 7.3.9, 7.4.8, 7.4.9, 7.4.10, 7.4.11, 8.4.3, and 8.5.
Bross et al., "WD5: Working Draft 5 of High-Efficiency Video Coding," 7th Meeting: Geneva, Switzerland, Nov. 21-30, 2011, JCTVC-G1103_d2, 214 pp, sections 7.3.8, 7.3.9, 7.4.8, 7.4.9, 7.4.10, 8.4.3, and 8.5.
Bross et al., "High efficiency video coding (HEVC) text specification draft 6," 8th Meeting: San Jose, CA, USA, Feb. 1-10, 2012, JCTVC-H1003, 259 pp, sections 7.3.8, 7.3.9, 7.3.10, 7.4.8, 7.4.9, 7.4.10, 8.5.3, and 8.6.
Bross et al., "High efficiency video coding (HEVC) text specification draft 7," 9th Meeting: Geneva, CH, Apr. 27-May 7, 2012, JCTVC-I1003_d2, 290 pp, sections 7.3.8, 7.3.9, 7.3.10, 7.4.8, 7.4.9, 7.4.10, 8.5.3, and 8.6.
Bross et al., "High efficiency video coding (HEVC) text specification draft 8," 10th Meeting: Stockholm, SE, Jul. 11-20, 2012, JCTVC-J1003_d7, 261 pp, sections 7.3.11, 7.3.12, 7.3.13, 7.4.8, 7.4.9, 7.4.10, 7.4.11, 8.5.3, and 8.6.
Bross et al., "High efficiency video coding (HEVC) text specification draft 9," 11th Meeting: Shanghai, CN, Oct. 10-19, 2012, JCTVC-K1003_v7, 290 pp, sections 7.4.9.10, 7.4.9.11, 8.5.4, and 8.6.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp, sections 7.4.9.10, 7.4.9.11, 8.5.4, and 8.6.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp, sections 7.3.5.3, 7.4.5.3, and 8.5.
International Preliminary Report on Patentability from International Application No. PCT/US2013/061890, dated Jan. 9, 2015, 8 pp.

\* cited by examiner

CSBF$_r$ = 0, CSBF$_l$=0

FIG. 3A

CSBF$_r$ = 1, CSBF$_l$=0

FIG. 3B

CSBF$_r$ = 0, CSBF$_l$=1

FIG. 3C

CSBF$_r$ = 1, CSBF$_l$=1

FIG. 3D

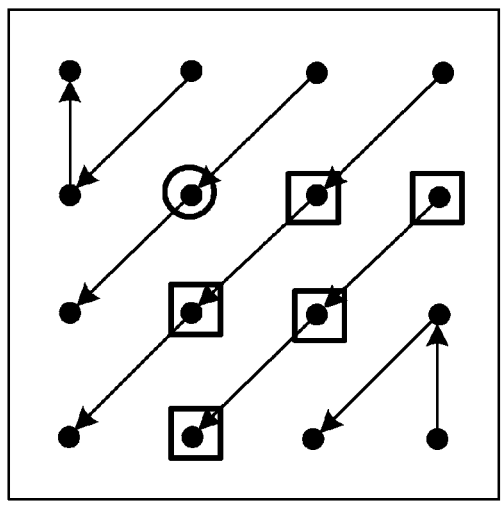
FIG. 9
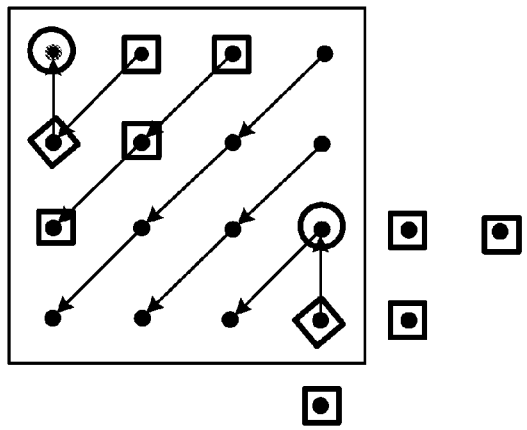 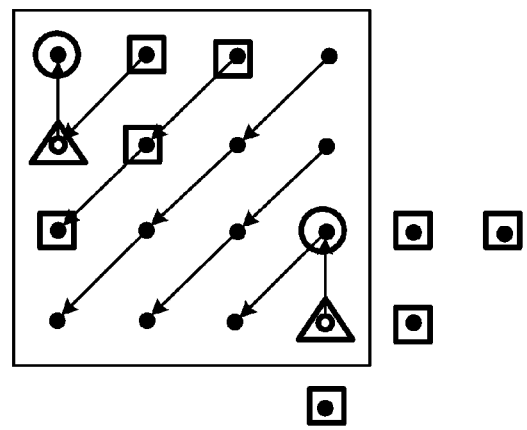
FIG. 10A　　　　　　　　　　　FIG. 10B

CONTEXT DERIVATION FOR CONTEXT-ADAPTIVE, MULTI-LEVEL SIGNIFICANCE CODING

This application claims the benefit of U.S. Provisional Patent Application 61/706,035 filed on 26 Sep. 2012, the entire content of which is incorporated herein by reference.

TECHNICAL FIELD

This disclosure relates generally to video coding and, more particularly, to coding of transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In a video coding process, intra- or inter-predictive coding results in residual data that may be represented by transform coefficients in a transform domain. The transform coefficients may be presented in a transform block. This disclosure describes techniques related to signaling levels of transform coefficients of a transform block and, more particularly, to context derivation for context-adaptive, multi-level significance coding of transform coefficients. The derived context can be used, for example, as a context for an arithmetic coding process, such as context-adaptive based arithmetic coding (CABAC).

In one example, a method for coding video data includes coding first significance information for transform coefficients associated with residual data, wherein the first significance information indicates if a first sub-block comprises at least one non-zero coefficient, wherein the first sub-block is a sub-block of an entire transform block; and, coding second significance information, wherein the second significance information indicates if a second sub-block comprises at least one non-zero coefficient, wherein the second sub-block is a sub-block of the first sub-block, wherein coding the second significance information comprises performing an arithmetic coding operation on the second significance information, wherein a context for the arithmetic coding operation is determined based on one or more neighboring sub-blocks of a same size as the first sub-block.

In another example, a device for coding video data that includes a video coder configured to code first significance information for transform coefficients associated with residual data, wherein the first significance information indicates if a first sub-block comprises at least one non-zero coefficient, wherein the first sub-block is a sub-block of an entire transform block; and, code second significance information, wherein the second significance information indicates if a second sub-block comprises at least one non-zero coefficient, wherein the second sub-block is a sub-block of the first sub-block, wherein coding the second significance information comprises performing an arithmetic coding operation on the second significance information, wherein a context for the arithmetic coding operation is determined based on one or more neighboring sub-blocks of a same size as the first sub-block.

In another example, a computer-readable storage medium storing instructions that when executed by one or more processors cause the one or more processors to code first significance information for transform coefficients associated with residual data, wherein the first significance information indicates if a first sub-block comprises at least one non-zero coefficient, wherein the first sub-block is a sub-block of an entire transform block; and, code second significance information, wherein the second significance information indicates if a second sub-block comprises at least one non-zero coefficient, wherein the second sub-block is a sub-block of the first sub-block, wherein coding the second significance information comprises performing an arithmetic coding operation on the second significance information, wherein a context for the arithmetic coding operation is determined based on one or more neighboring sub-blocks of a same size as the first sub-block.

In another example, an apparatus for coding video data includes means for coding first significance information for transform coefficients associated with residual data, wherein the first significance information indicates if a first sub-block comprises at least one non-zero coefficient, wherein the first sub-block is a sub-block of an entire transform block; and, means for coding second significance information, wherein the second significance information indicates if a second sub-block comprises at least one non-zero coefficient, wherein the second sub-block is a sub-block of the first sub-block, wherein coding the second significance information comprises performing an arithmetic coding operation on the second significance information, wherein a context for the arithmetic coding operation is determined based on one or more neighboring sub-blocks of a same size as the first sub-block.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3D show patterns for context assignment for coefficients in a 4×4 sub-block depending on the bottom and right coefficient group flag.

FIG. 9 is a conceptual diagram that illustrates an exemplary five-point support used to define a context model for a significance map of coefficients in a video block scanned using a reverse diagonal scanning order.

FIGS. 10A and 10B are conceptual diagrams that illustrate context dependency within the five-point support.

DETAILED DESCRIPTION

Figure 1:
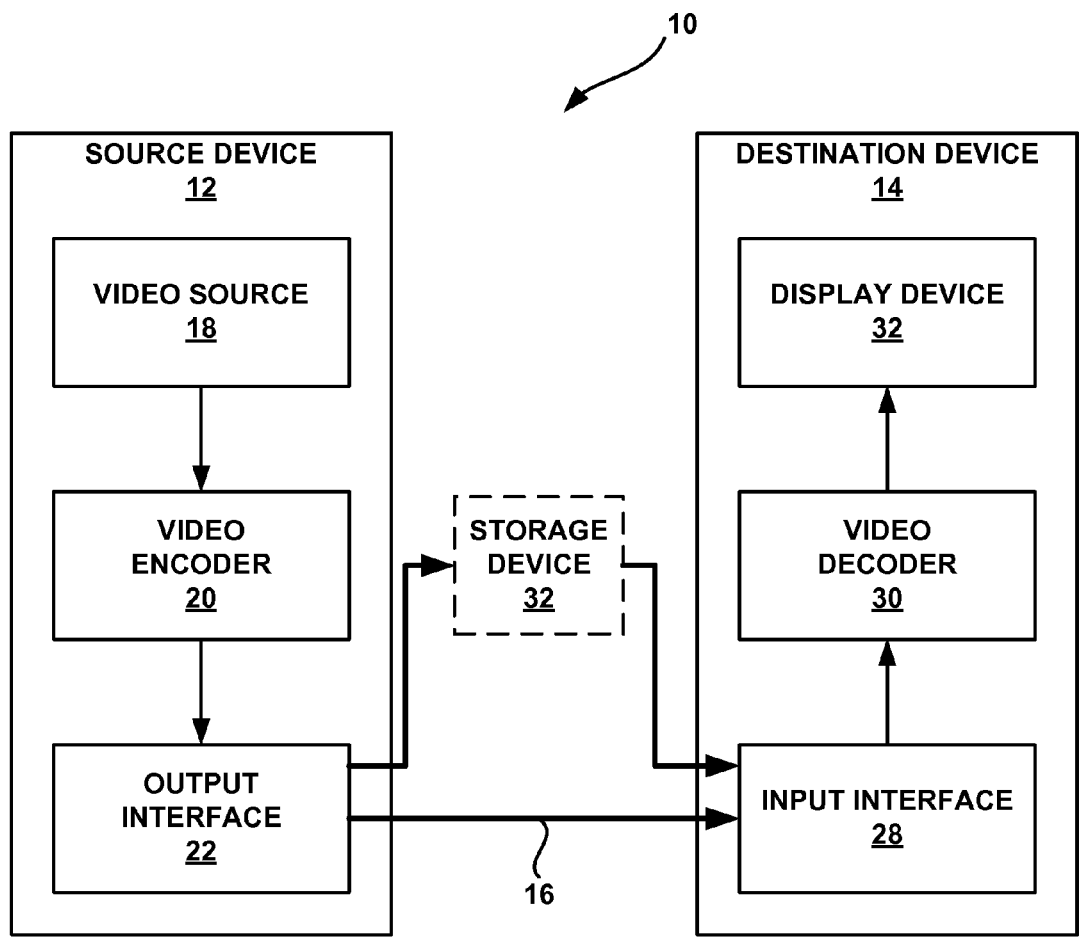
FIG. 1 is a block diagram illustrating an example video encoding and decoding system that may utilize the techniques described in this disclosure.

In a video coding process, a video decoder performs intra- or inter-prediction for a current block of video data based on an already decoded block of video data. In order to make a reconstructed video block more closely match the original video data, the video decoder also receives from a video encoder residual data that generally corresponds to the difference between the predicted video data and the original video data. Thus, when decoded, the predicted video data plus the residual video data may provide a better approximation of the original video data than the predicted video data alone. As will be explained in greater detail below, in order to reduce the number of bits needed to code the residual data, a video encoder transforms and quantizes the residual data. Once quantized and transformed, the residual data is represented by transform coefficients in a transform domain. The transform coefficients may be presented in a transform block.

This disclosure describes techniques related to signaling levels of transform coefficients of a transform block. In addition, this disclosure describes techniques for context derivation for context-adaptive, multi-level significance coding of transform coefficients. The derived context can be used, for example, as a context for an arithmetic coding process, such as context-adaptive based arithmetic coding (CABAC). It should be noted that the term level is used in this disclosure in two different manners. The term level may, in some instances, be used to refer to the value or absolute value of a coefficient. The term level, however, may also be used to refer to different locations within a hierarchical structure. For example, an entire transform block may be divided into a first set of sub-blocks, each sub-block of the first set of sub-blocks may be further divided into a second set of the sub-block levels, and each of the second sub-blocks may include individual coefficients. These different stages of the transform block hierarchy may, for example, be called the entire transform block level, the first sub-block level, the second sub-block level, and the individual coefficient level.

Significance coding generally refers to coding information indicative of whether or not a transform coefficient or a group of transform coefficients includes at least one transform coefficient with a value other than zero. A transform coefficient is considered to be significant if it has a value (also referred to as level) other than zero. A block of transform coefficients is considered to be significant it includes at least one significant coefficient.

Depending on characteristics of the video data being coded, video encoders may code transform blocks in various sizes, such as 32×32, 16×16, and 8×8. It is also contemplated that future video coding standards or future extensions of current video coding standards may incorporate even larger transform sizes, such as 64×64 or 128×128. In order to more efficiently code the information of the transform block, the transform block may be divided into sub-blocks that are smaller than the full transform block. For example, a 16×16 transform block may be divided into 4×4 sub-blocks and/or 2×2 sub-blocks. This disclosure introduces multi-level significance coding. Thus, according to techniques of this disclosure, when coding a transform block, at a first level (e.g. an entire transform block level), a video encoder can code first significance information (e.g. a coded block flag) to indicate if the transform block includes at least one significant coefficient (i.e., at least one non-zero coefficient). If the entire transform block contains at least one significant coefficient, then for a second level (e.g., a first sub-block level), the video encoder can code second significance information for each sub-block indicating if the sub-block includes a significant coefficient. For each sub-block that includes a significant coefficient, the video coder can code third level (i.e. a second sub-block level) significance information indicating if the sub-block of the sub-block includes a significant coefficient. This multi-level significance coding can be continued down to a lowest level (e.g., the individual coefficient level).

According to the techniques of this disclosure, the size of sub-blocks used for lower levels may be independent of the size of the transform block. As one example, the sub-block size for a second level may be 16×16 regardless of whether the first level transform block is 32×32 or something larger. As another example, the sub-block size for a first sub-block level may always be 8×8 regardless of whether the full transform block is 16×16 or 32×32. In this disclosure, the term sub-block is generally meant to refer to a smaller block that is a portion of a larger block. For example, a 32×32 block may be divided into four 16×16 sub-blocks, sixteen 8×8 sub-blocks, or divided into blocks of some other size. Sub-blocks may be further divided into smaller sub-blocks. As one example, a 32×32 block may be divided into four 16×16 sub-blocks, while each of the 16×16 sub-blocks may be further divided into four 8×8 blocks or sixteen 4×4 sub-blocks.

For each sub-block level, the video coder can arithmetically code the significance information based on a context. According to the techniques of this disclosure, the context for significance information of a particular level can be based both on already coded sub-blocks of the same level as well as already coded blocks or sub-blocks of a higher level.

FIG. 1 is a block diagram illustrating an example video encoding and decoding system 10 that may utilize the transform block coding techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of the HEVC standard, referred to as "HEVC Working Draft 8" or "WD8," is described in document JCTVC-J1003, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 July. WD8 is hereby incorporated by reference in its entirety. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013. WD10 is hereby incorporated by reference in its entirety.

Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. As introduced above, this disclosure describes techniques for coding and signaling TUs from video encoder 20 to video decoder 30. This disclosure uses the term "video block" to generically refer to any of a CU, LCU, PU, TU, or other types of video blocks.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

As introduced above and as will be described in more detail below, video encoder 20 may signal the TU to video decoder 30 using context adaptive, multi-level significance coding as described in this disclosure. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

In general, entropy coding data symbols using CABAC involves one or more of the following steps:

(1) Binarization: If a symbol to be coded is non-binary valued, it is mapped to a sequence of so-called "bins." Each bin can have a value of "0" or "1."

(2) Context Assignment: Each bin (in regular mode) is assigned to a context. A context model determines how a context for a given bin is calculated based on information available for the bin, such as values of previously encoded symbols or bin number.

(3) Bin encoding: Bins are encoded with an arithmetic encoder. To encode a bin, the arithmetic encoder requires as an input a probability of the bin's value, i.e., a probability that the bin's value is equal to "0," and a probability that the bin's value is equal to "1." The (estimated) probability of each context is represented by an integer value called a "context state." Each context has a range of states, and thus the range of states (i.e., estimated probabilities) is the same for bins assigned to one context, and differs between contexts.

(4) State update: The probability (state) for a selected context is updated based on the actual coded value of the bin (e.g., if the bin value was "1," the probability of "1's" is increased).

It should be noted that PIPE uses principles similar to those of arithmetic coding, and can thus potentially also utilize the techniques of this disclosure.

To perform CABAC, video encoder 20 may assign a context within a context model to a symbol to be transmitted. The context may relate to, for example, whether neighboring values of the symbol are non-zero or not.

In HEVC WD8, for 8×8, 16×16, and 32×32 transform blocks, video encoder 20 uses a 4×4 sub-block scan. The sub-blocks are scanned in the reverse direction using a top-right to bottom-left scan (e.g., from high frequencies to low frequencies). Within a sub-block, the transform coefficients are also scanned in the reverse direction using a top-right to bottom-left scan. Each 4×4 sub-block is coded in five coding passes, namely, significance, level greater than 1, level greater than 2, sign, and coefficient level greater than 2 remaining.

In some proposals for the HEVC standard, video encoder 20 groups coefficients into chunks or subsets, also sometimes called a coefficient group (CG). Video encoder 20 codes the significance map and level information (absolute value and sign) of the transform coefficients for each subset. In one example, a 4×4 sub-block (or subset) of transform coefficients within the larger transform block are treated as a subset. The following symbols are coded and signaled from video encoder 20 to video decoder 30 to represent the coefficients level information within a subset. In one example, video encoder 20 encodes all the symbols in an inverse scan order. It should be noted that the following symbols may be referred to as "flags." It should be noted that any of the "flags" discussed in this disclosure need not be limited to a binary symbol, but may also be implemented as multiple bit syntax elements.

significant_coeff_flag (abbr. sigMapFlag): This flag indicates the significance of each coefficient in a CG. A coefficient with an absolute value of one or greater is considered to be significant. As one example, a sigMapFlag value of 0 indicates that the coefficient is not significant, while a value of 1 indicates that the coefficient is significant. This flag may generally be referred to as a significance flag.

coeff_abs_level_greater1_flag (abbr. gr1Flag): This flag indicates whether the absolute value of the coefficient is larger than one for any non-zero coefficients (i.e., coefficients with sigMapFlag as 1). As one example, a gr1Flag value of 0 indicates that the coefficient does not have an absolute value greater than one, while a value of 1 for the gr1Flag indicates that the coefficient does have an absolute value greater than one. This flag may generally be referred to as a greater-than-one flag.

coeff_abs_level_greater2_flag (abbr. gr2Flag): This flag indicates whether the absolute value of the coefficient is larger than two for any coefficients with an absolute value larger than one (i.e., coefficients with gr1Flag as 1). As one example, a gr2Flag value of 0 indicates that the coefficient does not have an absolute value greater than two, while a value of 1 for the gr2Flag indicates that the coefficient does have an absolute value greater than two. This flag may generally be referred to as a greater-than-two flag.

coeff_sign_flag (abbr. signFlag): This flag indicates the sign information for any non-zero coefficients (i.e., coefficients with sigMapFlag as 1). For example, a zero for this flag indicates a positive sign, while a 1 indicates a negative sign.

coeff_abs_level_remaining (abbr. levelRem): This syntax element indicates the absolute level values of the remaining coefficients. For example, for this flag, the absolute value of the coefficient minus three is coded (abs(level)−3) for each coefficient with an absolute value larger than two (i.e. coefficients with gr2Flag as 1).

Figure 2:
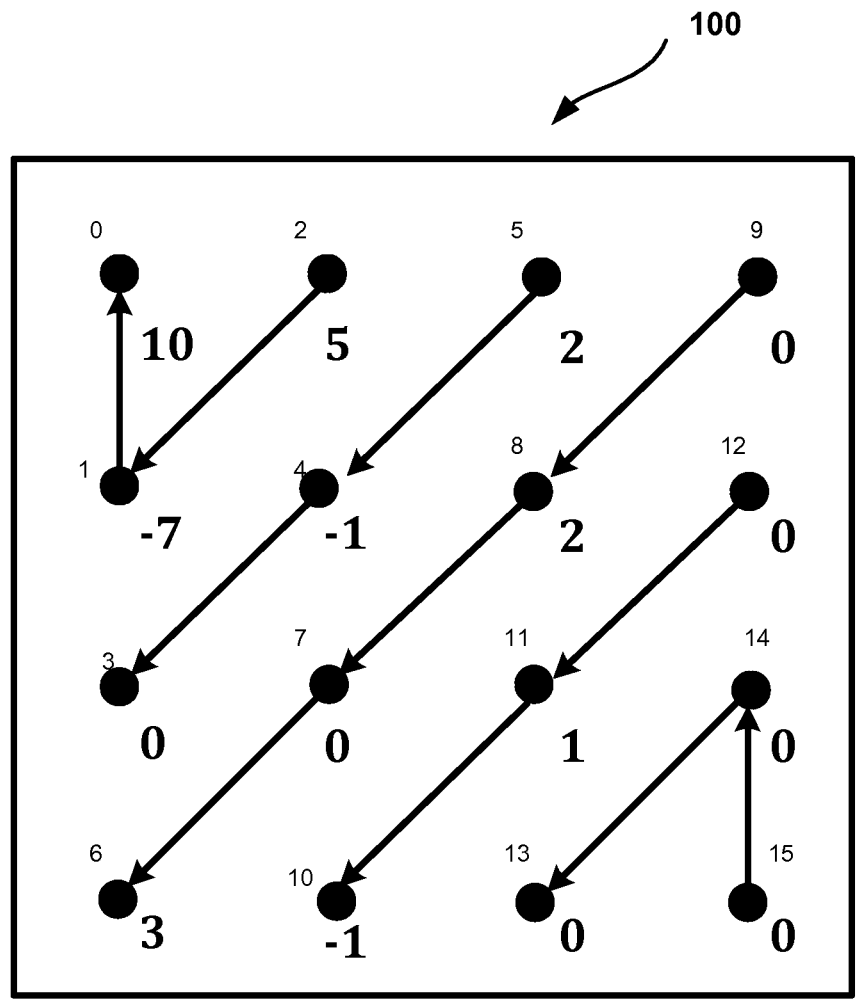
FIG. 2 is a conceptual drawing showing an example inverse diagonal scan of a 4×4 coefficient group of transform coefficients.

FIG. 2 shows an example of quantized coefficients in a 4×4 block 100. Block 100 may be a 4×4 transform block or may be a 4×4 sub-block (subset) in an 8×8, 16×16 or 32×32 transform block. The encoded symbols for the coefficients shown in FIG. 2, scanned in an inverse scan order, are summarized in Table 1. In Table 1, scan_pos refers to the position of the coefficient along the inverse diagonal scan shown in FIG. 2. Scan_pos 15 is the first coefficient scanned and is located in the lower right corner of block 100. The quantized coefficient at scan_pos 15 has an absolute value of 0. Scan_pos 0 is the last coefficient scanned and is located in the upper left corner of block 100. The quantized coefficient at scan_pos 0 has an absolute value of 10. In the case of a 4×4 transform block or the last 4×4 sub-block in a larger transform block, the first four sigMapFlags do not need to be coded, since the position of the last non-zero coefficient is known. That is, coding of the sigMapFlag may begin at the last non-zero coefficient (in this example, the coefficient at scan_pos 11). In some instances, the position of the first non-zero may also be known, so the SigMapFlag for scan_pos11 may additionally not be signaled.

TABLE 1

Coded symbols for the coefficients of a 4 × 4 TU or a 4 × 4 CG

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |
| gr2Flag | | | | | | | | 0 | | 1 | 0 | | | 1 | 1 | 1 |
| signFlag | | | | | 0 | 1 | | 0 | | 0 | 0 | 1 | 1 | 0 | 1 | 0 |
| levelRem | | | | | | | | | | 0 | | | | 2 | 4 | 7 |

Among these symbols, the bins of sigMapFlag, gr1Flag and gr2Flag are encoded with adaptive context models. The signFlag and binarized bins of levelRem are encoded through bypass mode with fixed equal probability models (e.g., an exponential Golomb code).

The coding of the significance of a block or sub-block may include two parts. First, a coded sub-block flag (CSBF) is coded (or inferred) for each coefficient group to indicate whether there are any non-zero coefficients in the sub-block. If CSBF is 1, significant coefficient flags for each transform coefficient in the coefficient group are coded. In WD8, the significant flag contexts are dependent on the position of the coefficient within the 4×4 sub-block, whether the sub-block contains a DC coefficient, and the CSBF for the sub-block to the right ($CSBF_R$) and below ($CSBF_L$).

FIGS. 3A-3D shows the four different patterns for context assignment of a 4×4 sub-block depending on $CSBF_R$ and $CSBF_L$. The coefficients within the 4×4 sub-block are assigned contexts, by video encoder 20 and video decoder 30, depending on $CSBF_R$ and $CSBF_L$, as shown in FIGS. 3A-3D. The numbers (0, 1, and 2) in the blocks of FIGS. 3A-3D correspond to different contexts. In the example, of FIGS. 3A-3D, a context of 2 may indicate a high likelihood (e.g. greater than 50/50) that a coefficient is significant, while a context of 0 may indicate a low likelihood (e.g. less than 50/50) that a coefficient is significant. A context of 1 may indicate an approximate 50/50 likelihood that the coefficient is significant. FIGS. 3A-3D are just one example of context patterns, and it is contemplated that the techniques of this disclosure may be used with different context patterns, including patters with more or fewer contexts.

If the 4×4 sub-block does not contain a DC coefficient, a context offset of 3 is applied. As an example, if a 4×4 sub-block does not contain DC coefficient, and the context assignment from FIGS. 3A-3D is 2, then the actual context used would be 5. In other words, the context derivation process is exactly the same in both cases, but different sets of context for DC and non-DC sub-blocks are used (they are not sharing the same contexts). This example process is for luma transform coefficients. For chroma transform coefficients, the context offset based on whether the 4×4 sub-block contains the DC coefficient is not applied, and the contexts are shared for all sub-blocks. Thus, only three contexts are used for chroma. The DC coefficient always uses a separate context, which is shared for all TU sizes.

FIG. 3A shows an example of contexts for coefficients in a sub-block that has a lower neighboring sub-block with no non-zero coefficients (i.e. $CSBF_L$=0) and a right neighboring sub-block with no non-zero coefficients (i.e. $CSBF_R$=0). FIG. 3B shows an example of contexts for coefficients in a sub-block that has a lower neighboring sub-block with no non-zero coefficients (i.e. $CSBF_L=0$) and a right neighboring sub-block with at least one non-zero coefficients (i.e. $CSBF_R=1$). FIG. 3C shows an example of contexts for coefficients in a sub-block that has a lower neighboring sub-block with at least one non-zero coefficients (i.e. $CSBF_L=1$) and a right neighboring sub-block with no non-zero coefficients (i.e. $CSBF_R=0$). FIG. 3D shows an example of contexts for coefficients in a sub-block that has a lower neighboring sub-block with at least one non-zero coefficients (i.e. $CSBF_L=1$) and a right neighboring sub-block with at least one non-zero coefficients (i.e. $CSBF_R=1$).

FIGS. 3A-3D shows context numbering starting with 0 instead of the actual context offsets used in HEVC. The HEVC contexts are indexed. For sig_coeff_flag, for example, they are indexed depending on the block size and whether they are luma or chroma. To simplify, the contexts are just numbered from 0 in FIG. 3A-3D, disregarding the different offsets involved due to block size and color component. Offsets are a convention in HEVC not essential to the understanding or implementation of the techniques of this disclosure.

In HEVC, the significance information is coded at multiple levels, as introduced above. The coded block flag (CBF) signals the significance of an entire transform block. That is, the CBF indicates whether or not the entire transform block contains any significant (i.e., non-zero) coefficients. Within a transform block, a level corresponds to the significance of a sub-block (using the CSBF), and another level corresponds to the significance of individual coefficients. At this level, the significances of the individual coefficients are signaled using the syntax element significant_coeff_flag described above.

As described in this example, there are three levels of significance signaling in HEVC. According the examples of this disclosure, between CSBF (which is at 4×4 sub-block level) and significant_coeff_flag (which is at the individual coefficient level), there can be another level of signaling significance information, such as at the 2×2 sub-block level. More generally, according to the techniques of this disclosure, significance signaling may occur at the whole block level, the individual coefficient level, and two or more sub-block levels. The two or more sub-block levels may, for example, be the 2×2 sub-block level and the 4×4 sub-block levels, although other sub-block levels may be used as well.

The 2×2 sub-block significance may utilize its own flag and context derivation and patterns. This disclosure describes methods to signal 2×2 significance (or other intermediate sizes) and to utilize significance signaling at sub-block levels for potentially better performance when signaling transform coefficients. Thus, the other sub-block levels may provide context information used to signal significance information for a current sub-block level being coded. The significance information of the other sub-block level may enable an entropy encoder to better mode the probability of the significance information at the current level, thus potentially improving coding efficiency. Although the techniques of this disclosure may use the 2×2 sub-block level for purposes of explanation, it should be understood that the techniques described herein are not limited to the 2×2 sub-block level and may be applied to other sub-block levels.

According to techniques of this disclosure, a syntax element (e.g., a flag) can be used to signal the significance of an additional sub-block. This flag can generically be called, for example, coded_additional_sub_block_flag (CASBF). In one example, the additional sub-block may be a 2×2 sub-block, in which case the flag may be called, for example, coded_2×2_sub_block_flag (C2SBF). C2SBF can be set equal to 1 if at least one coefficient in the 2×2 sub-block is significant. Otherwise, the C2SBF can be set to 0.

To potentially improve the coding of CASBF or C2SBF, the flag can be context coded. The selection of the context used for a particular sub-block may impact the performance. According to the techniques of this disclosure, the C2SBF context may depend on the C2SBF of the neighboring 2×2 sub-blocks already coded, and/or the CSBF of neighboring 4×4 sub-blocks, and/or the significant_coeff_flag of neighboring coefficients of the sub-block. The neighboring coefficients/sub-blocks used for context derivation may comprise a causal neighborhood of the current sub-block. In this regard, "causal" neighbors are neighbors that have been coded, and thus their information is accessible to both video encoder 20 and video decoder 30, when coding current significance information. In this example, the current significance information may include the C2SBF flag. In one example, the neighborhood may include the coefficient/sub-block on the right, the one below, and/or the one on the lower-right diagonal.

Context assignment for the intermediate sub-block/CG size will now be described. In one example of the disclosure, the patterns for the context assignment for the 2×2 sub-blocks may be dependent on the previously coded C2SBF and/or previously coded CSBF. In one example, the pattern depends on the sub-blocks to the right and below the current sub-block. In another example, the pattern depends also on the position of the 2×2 sub-block within the 4×4 sub-block and/or within the transform block.

In another example of the disclosure, the context assignment may also depend on the position of the 2×2 sub-block within the 4×4 sub-block and/or within the transform block. That is, two 2×2 sub-blocks might have the same significance map in the neighboring sub-blocks. 2×2 sub-blocks may be assigned the same pattern but have different context sets depending on their position within the transform block.

Figure 4:
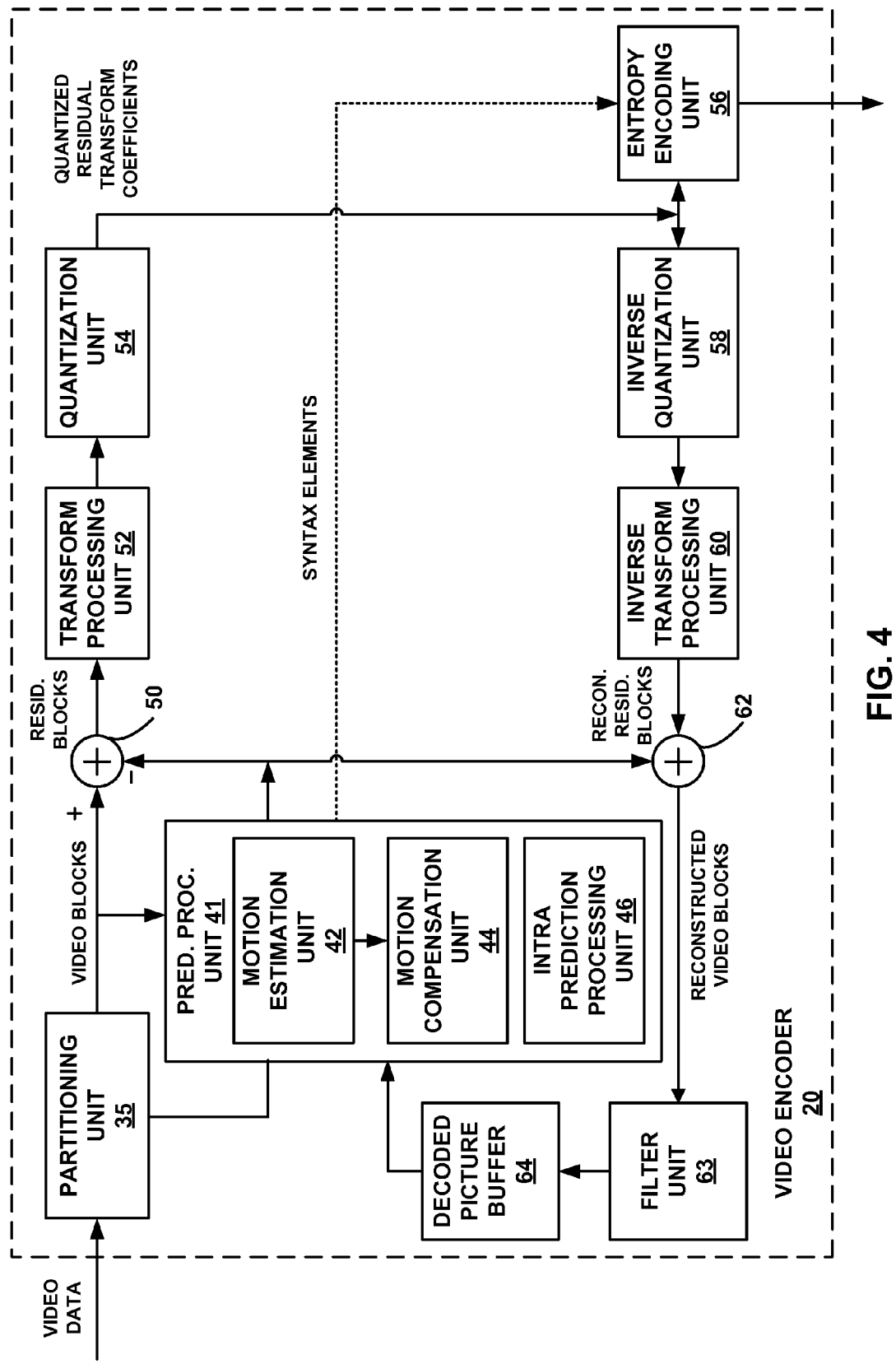
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a partitioning unit 35, prediction processing unit 41, filter unit 63, decoded picture buffer 64, summer 50, inverse transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 4 as being an in loop filter, in other configurations, filter unit 63 may be implemented as a post loop filter.

As shown in FIG. 4, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to inverse transform processing unit 52. Inverse transform processing unit 52 transforms the residual video data into residual transform coefficients using a transform, such as a discrete cosine transform (DCT) or a conceptually similar transform. Inverse transform processing unit 52 may convert the residual video data from a pixel domain to a transform domain, such as a frequency domain.

Inverse transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan. Following quantization, entropy encoding unit 56 entropy encodes the quantized transform coefficients. Entropy encoding unit 56 may, for example, generate the significant_coeff_flag, coeff_abs_level_greater1_flag, coeff_abs_level_greater2_flag, coeff_sign_flag, and coeff_abs_level_remaining syntax elements described above as well as the CSBFR, CSBFB, CASBF, and C2SBF flags described above.

For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In this manner, video encoder 20 of FIG. 4 represents an example of a video encoder configured to code first significance information for transform coefficients associated with residual data, where the first significance information corresponds to significances of a first sub-block and the first sub-block is a sub-block of an entire transform block; code second significance information, where the second significance information corresponds to significance of a second sub-block and where the second sub-block is a sub-block of the first sub-block; and, perform an arithmetic coding operation on the second significance information. A context for the arithmetic coding operation can be determined based on one or more neighboring sub-blocks of a same size as the first sub-block. In one example, the first sub-block is a 4×4 block and the second sub-block is a 2×2 sub-block. The second significance information can indicate if at least one coefficient of the second sub-block is a non-zero coefficient. The context can be based on significance information of one or more neighboring sub-blocks of a same size as the second sub-block, based on significance information of one or more neighboring individual coefficients, or based on a position of the second sub-block within the first sub-block. A pattern for a context assignment can be based on a position of the second sub-block within the first sub-block.

Figure 5:
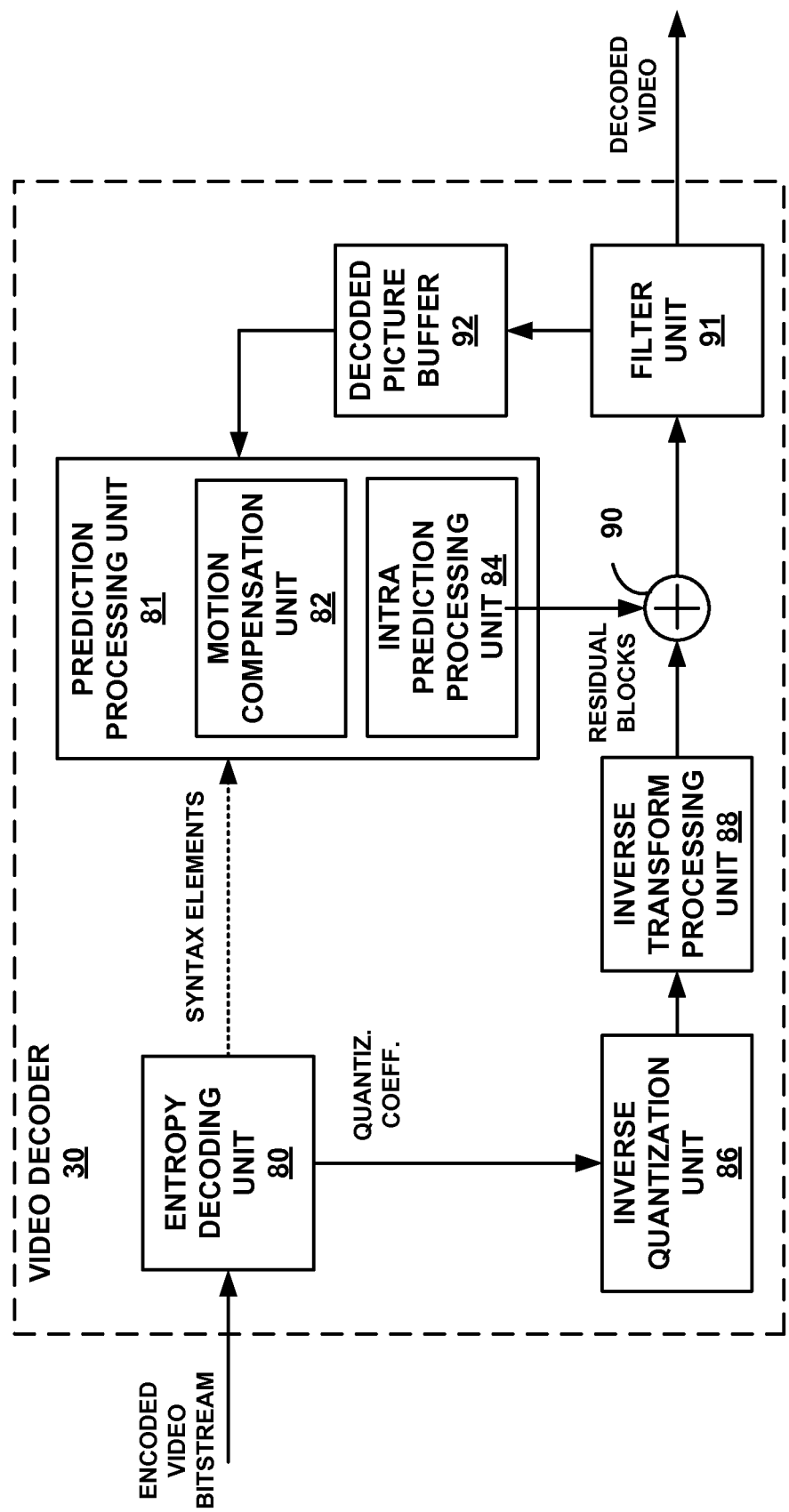
FIG. 5 is a block diagram illustrating an example video decoder that may implement the techniques described in this disclosure.

FIG. 5 is a block diagram illustrating an example video decoder 30 that may implement the techniques described in this disclosure. In the example of FIG. 5, video decoder 30 includes an entropy decoding unit 80, prediction unit 81, inverse quantization unit 86, inverse transformation unit 88, summer 90, filter unit 91, and decoded picture buffer 92. Prediction unit 81 includes motion compensation unit 82 and intra prediction processing unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 may generate the quantized coefficients, for example, by receiving and parsing the significant_coeff_flag, coeff_abs_level_greater1_flag, coeff_abs_level_greater2_flag, coeff_sign_flag, and coeff_abs_level_remaining syntax elements described above as well as the CSBFR, CSBFB, CASBF, and C2SBF flags described above. Entropy decoding unit 80 forwards the motion vectors and other syntax elements to prediction unit 81. Video decoder 30 may receive the syntax elements at the video slice level and/or the video block level.

When the video slice is coded as an intra-coded (I) slice, intra prediction processing unit 84 of prediction unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 5 as being an in loop filter, in other configurations, filter unit 91 may be implemented as a post loop filter. The decoded video blocks in a given frame or picture are then stored in decoded picture buffer 92, which stores reference pictures used for subsequent motion compensation. Decoded picture buffer 92 also stores decoded video for later presentation on a display device, such as display device 32 of FIG. 1.

In this manner, video decoder 30 of FIG. 5 represents an example of a video decoder configured to code first significance information for transform coefficients associated with residual data, wherein the first significance information corresponds to significances of a first sub-block, wherein the first sub-block is a sub-block of an entire transform block; code second significance information, where the second significance information corresponds to significance of a second sub-block and where the second sub-block is a sub-block of the first sub-block; and, perform an arithmetic coding operation on the second significance information. A context for the arithmetic coding operation can be determined based on one or more neighboring sub-blocks of a same size as the first sub-block. In one example, the first sub-block is a 4×4 block and the second sub-block is a 2×2 sub-block. The second significance information can indicate if at least one coefficient of the second sub-block is a non-zero coefficient. The context can be based on significance information of one or more neighboring sub-blocks of a same size as the second sub-block, based on significance information of one or more neighboring individual coefficients, or based on a position of the second sub-block within the first sub-block. A pattern for a context assignment can be based on a position of the second sub-block within the first sub-block.

Figure 6:
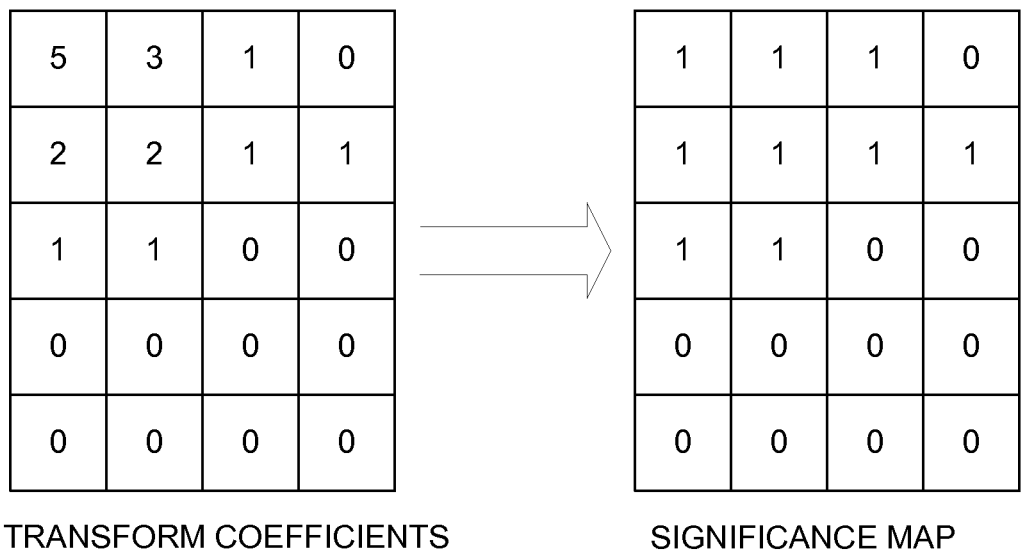
FIG. 6 is a conceptual diagram that illustrates a relation between transform coefficients in a video block and a significance map associated with the video block.

Additional aspects of significance maps will now be described. FIG. 6 is a conceptual diagram that illustrates a relation between transform coefficients in a video block and a significance map associated with the video block. As illustrated in FIG. 6, the significance map includes a "1" to indicate each instance of a significant coefficient value, i.e., a value greater than zero, in the video block. The significance map may be signaled in a bitstream that is decodable by a video decoder, such as video decoder 30, to determine the location of the significant, i.e., greater than zero, coefficients in the video block to be decoded. More specifically, a position of a last non-zero coefficient within the video block may be signaled in the bitstream. The position of the last non-zero coefficient in the video block depends on the scanning order used for the video block. Additional syntax elements may be signaled to indicate the other significant coefficients relative to the last non-zero coefficient according to a known or knowable scanning order.

FIGS. 7A-7D are conceptual diagrams that illustrate examples of blocks of video data scanned using a zig-zag scanning order, a horizontal scanning order, a vertical scanning order, and a diagonal scanning order, respectively. As shown in FIGS. 7A-7D, an 8×8 block of video data, e.g., a TU of a CU, may include sixty-four residual coefficients in corresponding block positions, denoted with circles. For example, blocks 101, 102, 103 and 104 may each have a size of 8×8 and, therefore, include sixty-four residual coefficients generated using prediction techniques previously described.

According to the techniques described in this disclosure, the sixty-four residual coefficients in each of blocks 101, 102, 103 and 104 may be transformed using one of a 2-D transform, a horizontal 1-D transform, and a vertical 1-D transform, or the residual coefficients may not be transformed at all. Whether transformed or not, the coefficients in each of video blocks 101, 102, 103 and 104 are scanned in preparation for entropy coding using one of the zig-zag scanning order, the horizontal scanning order, and the vertical scanning order.

Figure 7A:
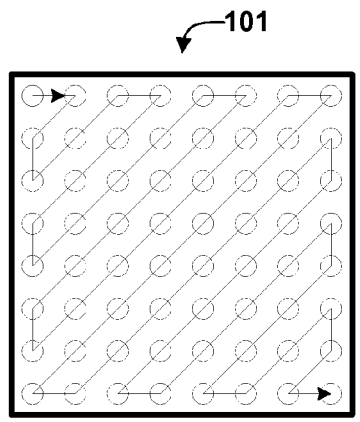
FIGS. 7A-7D are conceptual diagrams that illustrate examples of blocks of video data scanned using a zig-zag scanning order, a horizontal scanning order, a vertical scanning order, and a diagonal scanning order.
Figure 7B:
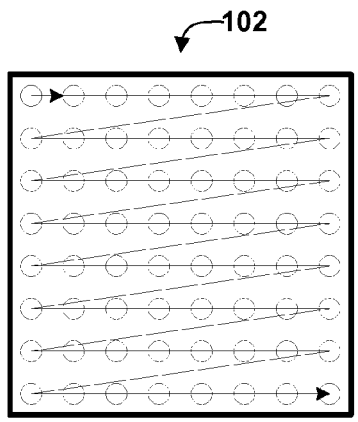
Figure 7C:
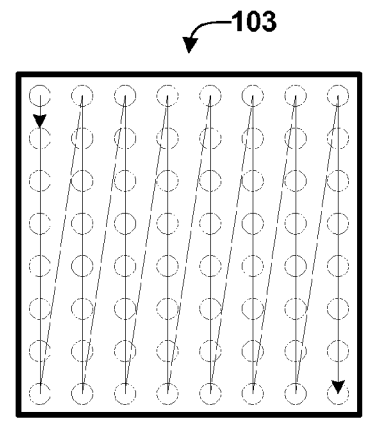
Figure 7D:
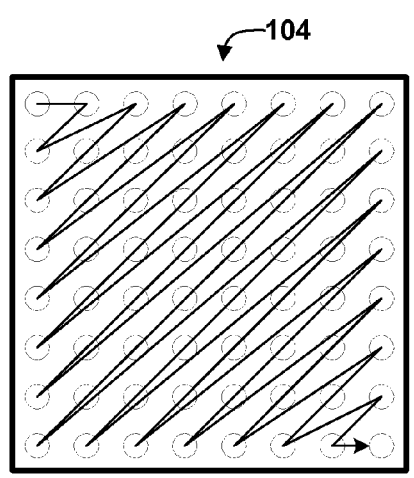

As shown in FIG. 7A, the scanning order associated with block 101 is the zig-zag scanning order. The zig-zag scanning order scans the quantized transform coefficients of block 101 in a diagonal manner as indicated by the arrows in FIG. 7A. Similarly, in FIG. 7D, the diagonal scanning order scans the quantized transform coefficients of block 104 in a diagonal manner as indicated by the arrows in FIG. 7D. As shown in FIGS. 7B and 7C, the scanning orders associated with blocks 102 and 103 are the horizontal scanning order and the vertical scanning order, respectively. The horizontal scanning order scans quantized transform coefficients of block 102 in a horizontal line-by-line, or "raster" manner, while the vertical scanning order scans the quantized transform coefficients of block 103 in a vertical line-by-line, or "rotated raster" manner, also as indicated by the arrows in FIGS. 7B and 7C.

In other examples, as described above, a block may have a size that is smaller or larger than the size of blocks 101, 102, 103 and 104, and may include more or fewer quantized transform coefficients and corresponding block positions. In these examples, a scanning order associated with a particular block may scan the quantized transform coefficients of the block in a substantially similar manner as shown in the examples of 8×8 blocks of FIGS. 7A-7D, e.g., a 4×4 block, or a 16×16 block, may be scanned following any of the scanning orders previously described.

Figure 8:
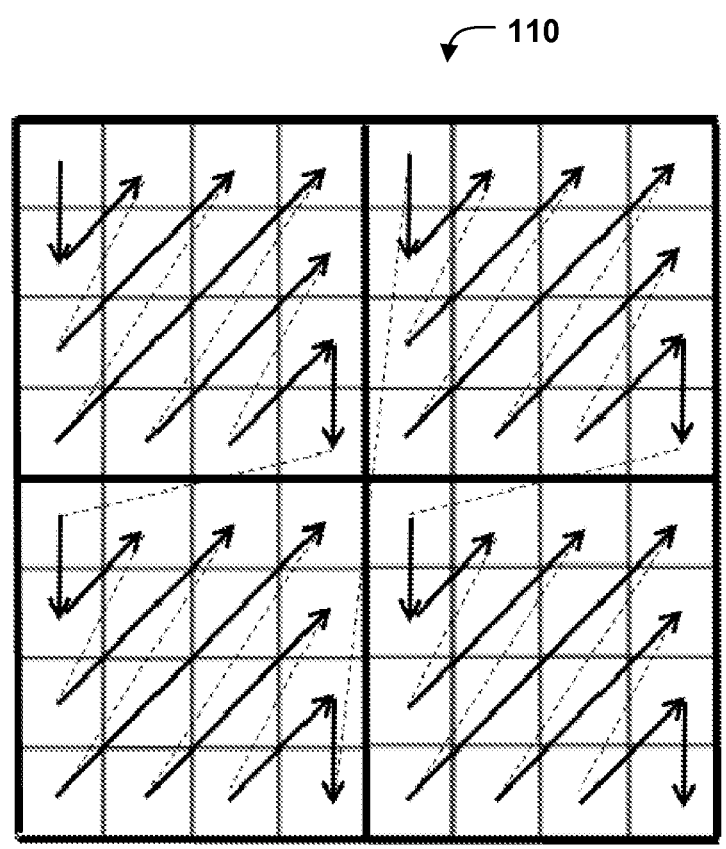
FIG. 8 is a conceptual diagram that illustrates an exemplary video block divided into sub-blocks for transform coefficient coding.

FIG. 8 is a conceptual diagram that illustrates an exemplary video block 110 divided into sub-blocks for transform coefficient coding. In the current HM, a sub-block concept is used for transform coefficient coding. A video coder may sub-divide any transform unit (TU) that is larger than a determined sub-block size into sub-blocks. For example, video block 110 is divided into four 4×4 sub-blocks.

In the illustrated example of FIG. 8, the video coder divides video block 110 into 4×4 sub-blocks. In other example, the video coder may divide video blocks into sub-blocks of other sizes, e.g., 8×8, 16×16, and the like. If the video coder uses the same sub-block size for all TUs of a frame or slice, gains may be achieved in a hardware implementation due to the uniformity achieved with the sub-block sizes. For example, all processing may be split in such sub-blocks, regardless of the TU size. A uniform sub-block size is not necessary, however, to carry out the techniques of this disclosure.

For coefficient coding, each 4×4 sub-block of video block 110 may be scanned using the diagonal scanning order, as shown on FIG. 8. In some examples, the video coder may use a unified scan for scanning transform coefficients of each sub-block. In this case, the same scan order is used for significance information, i.e., a significance map, coefficient levels, sign, and the like. In a first example, as shown in FIG. 8, the video coder may scan the transform coefficients using a diagonal scan. In another example, the video coder may scan the transform coefficients in an order that is opposite of that shown in FIG. 8, e.g., a reverse diagonal scan that begins in the lower right corner and proceeds to the upper left corner. In other examples, the video coder may scan the transform coefficients using a zig-zag, horizontal, or vertical scan. Other scanning directions/orientations are also possible.

For ease of explanation, this disclosure describes sub-blocks of a video block as being 4×4 sub-blocks. The techniques of this disclosure, however, may also be applied with respect to sub-blocks of different sizes, e.g., 2×2, 8×8, 16×16, and the like. For every 4×4 block a significant_coeffgroup_flag is coded, and if there is at least one nonzero coefficient in the sub-block this flag is set to one; otherwise it is set to zero. If significant_coeffgroup_flag is nonzero for a given sub-block, the 4×4 sub-block is scanned in the backward diagonal order, and significant_coeff_flag is coded for every coefficient of the sub-block to indicate the significance of the coefficient. Absolute values of the coefficients are also coded, i.e., coefficient levels. The group of these flags may be referred to as a significance map for the video block. In some example, instead of explicitly signaling the significance map, the significant_coeffgroup_flag may be implicitly derived using neighboring 4×4 sub-block flags, or when the 4×4 sub-block contains the last coefficient or a DC coefficient.

FIG. 9 is a conceptual diagram that illustrates an exemplary five-point support used to define a context model for a significance map of coefficients in a video block 112 scanned using a reverse diagonal scanning order. For context-adaptive coding, transform coefficients may be coded based on a context model that describes probabilities of the transform coefficient having a value of 0 or a value of 1. With respect to significance map coding, the context model describes the probabilities of whether a particular transform coefficient is significant, i.e., non-zero.

For the significance map coding, a five-point support S may be used to define a context model to code the significance map of the transform coefficients of video block 112. The five-point support may be referred to as a "context support neighborhood," or simply a "support neighborhood." That is, a video coder may look to the support to determine the probability of the significance of a current position being one or zero. The context support neighborhood defines the neighboring coefficients (e.g., which may include significance information) that may be used as contexts for coding a current coefficient. According to some examples of this disclosure, the context support neighborhood may be different for different coefficient positions within a block or sub-block.

In the example shown in FIG. 9, the five-point support S is represented by the points surrounded by squares, relative to a current or "target" position represented by the point surrounded by a circle. Context model Ctx (equation (1) below) may be defined as a sum of the significant flags in every point of the support, where a significance flag may be set to "1" if the corresponding transform coefficient is nonzero, and set to "0" otherwise.

$$Ctx = \sum_{p \in S} (coef_p \mathrel{!}= 0) \tag{1}$$

Accordingly, the significance flag count can be less or equal to the support cardinality.

However, the support S shown in FIG. 9 may not be suitable when calculating context for more than one transform coefficient (e.g., significance information associated with the transform coefficient) in parallel (referred to as "parallel significance context calculation" or simply "parallel context calculation"). For example, using the support S shown in FIG. 9 may impede the ability of the video coder to calculate contexts for significance information in parallel, because all data in the support S must be available (e.g., already coded) for enabling parallel calculation of contexts. In some instances, as described below with respect to FIG. 10A, a coder may be forced to wait for a support element in support S to finish coding before determining the context for another support element in support S. This delay reduces the ability of the video coder to efficiently process significance information.

FIGS. 10A and 10B are conceptual diagrams that illustrate context dependency within the five-point support. For example, to calculate a significance context for the position circled, it may be necessary to parse the significance flag of the position within the support S depicted in diamonds (shown in FIG. 10A). Such parsing may introduce a delay if there is a requirement to calculate significance contexts of two coefficients in parallel, because the elements in the diamonds are positioned immediately before the elements circled in scanning order. That is, the context of the position circled cannot be calculated at the same time as the position marked in the diamond because it depends on the position in the diamond, and therefore the position in the diamond must be coded prior to determining the context for the position circled.

To resolve this dependency, certain elements may be removed from support S, making the support with a so called "hole" (non-filled dot (triangle), shown in FIG. 10B). For example, the significance flag in the hole is skipped and not taken into account for the context calculation (i.e., assumed to be zero). Accordingly, there is no need to parse the significance flag in the hole position. The 5-point support shape depends on the position to allow for better parallel processing.

Figure 11:
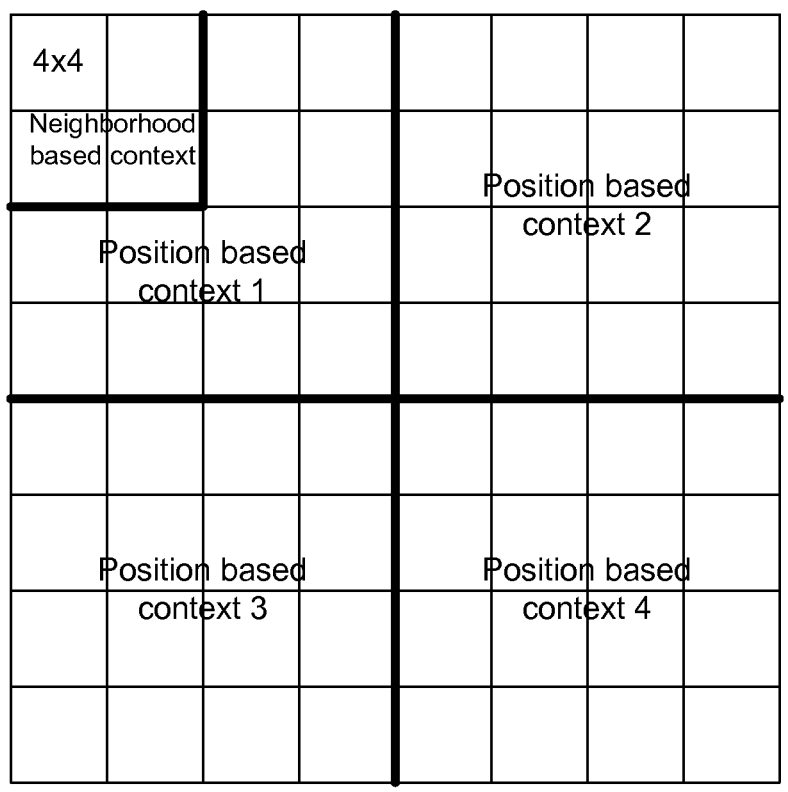
FIG. 11 is a conceptual diagram that illustrates exemplary assignment of neighborhood- or position-based contexts for each region of a video block.

FIG. 11 is a conceptual diagram that illustrates exemplary assignment of neighborhood- or position-based contexts for each region of a video block. As illustrated in FIG. 11, a hybrid type of contexts might be used as well, for example, for some regions contexts could be neighborhood based and for some regions of the same video block it can be fixed or position based. An advantage of the position-based approach is that it is not necessary to calculate context coefficient-wise; it can be done once for a region.

For the coefficient with (x, y) coordinates, regions can be defined according to the coefficient position. For example, if the condition (x+y>=threshold) is true, then this coefficient is assigned to region R2, otherwise it is in region R1. Similarly, coordinates can be assigned to regions based on 4×4 sub-blocks. For the sub-block with (X, Y) coordinates, regions can be defined according to the 4×4 sub-block position. For example, if the condition (X+Y>=Threshold) is true than this coefficient is assigned to region R2, otherwise it is in R1. The threshold may be fixed to some predefined value, such as an integer number equal to 4, 5, 6, 7 or 8, or may dependent on the video block, e.g., TU, size.

Figure 12:
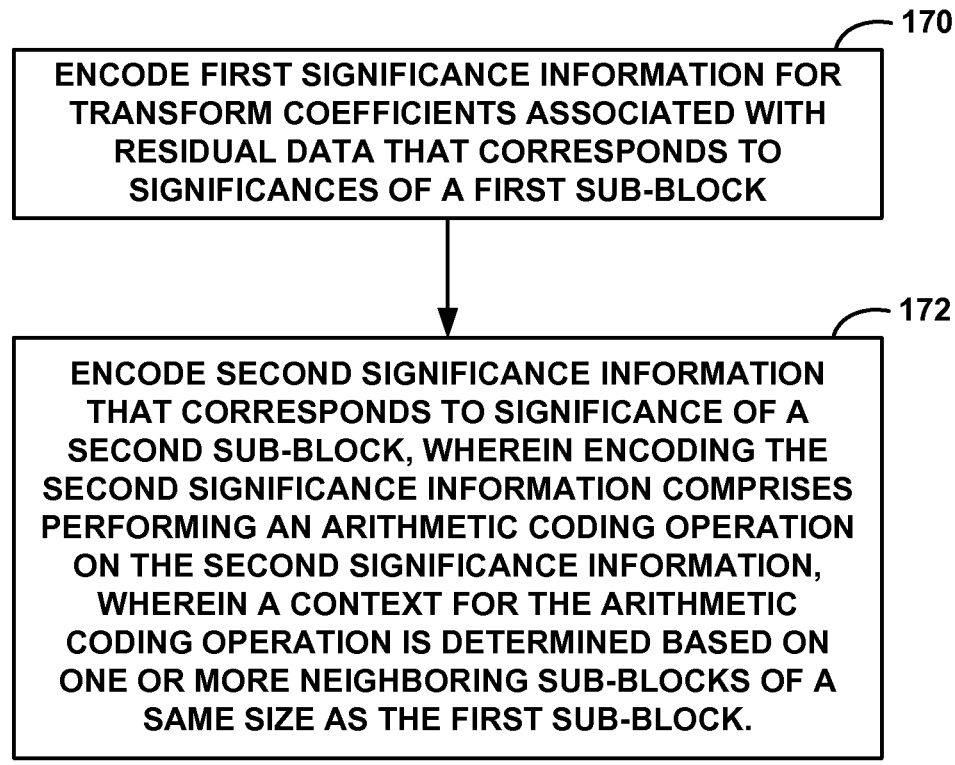
FIG. 12 is a flowchart showing an example video encoding method according to the techniques of this disclosure.

FIG. 12 is a flowchart showing an example video decoding method according to the techniques of this disclosure. The techniques of FIG. 12 may be carried out by one or more hardware units of video encoder 20. In one example, entropy encoding unit 56 may perform some of the techniques related to sign data hiding.

Video encoder 20 may encode first significance information for transform coefficients associated with residual data that corresponds to significances of a first sub-block (170). The first sub-block may be a sub-block of an entire transform block. Video encoder 20 may encode second significance information that corresponds to significance of a second sub-block by performing an arithmetic coding operation on the second significance information and determine a context for the arithmetic coding operation based on one or more neighboring sub-blocks of a same size as the first sub-block (172).

Figure 13:
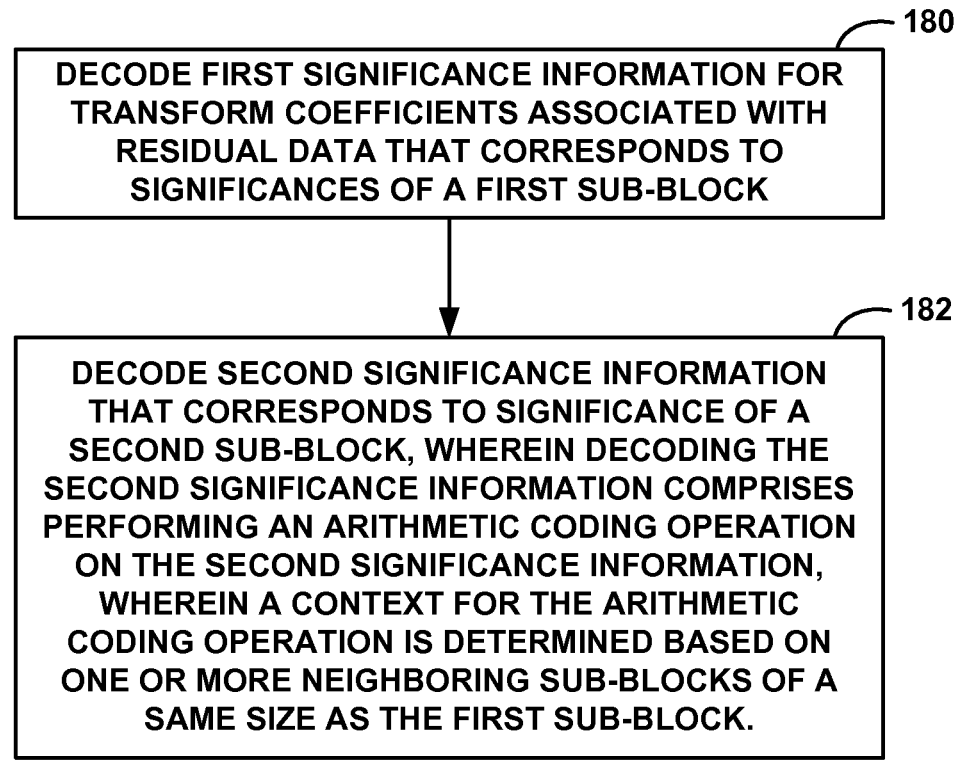
FIG. 13 is a flowchart showing an example video decoding method according to the techniques of this disclosure.

FIG. 13 is a flowchart showing an example video decoding method according to the techniques of this disclosure. The techniques of FIG. 13 may be carried out by one or more hardware units of video decoder 30. In one example, entropy decoding unit 70 may perform some of the techniques related to sign data hiding.

Video decoder 30 may decode first significance information for transform coefficients associated with residual data that corresponds to significances of a first sub-block (180). The first sub-block may be a sub-block of an entire transform block. Video decoder 30 may decode second significance information that corresponds to significance of a second sub-block by performing an arithmetic coding operation on the second significance information and determine a context for the arithmetic coding operation based on one or more neighboring sub-blocks of a same size as the first sub-block (182).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
 decoding, by a device comprising one or more processors, first significance information for transform coefficients associated with residual data, wherein the first significance information indicates if a first sub-block comprises at least one non-zero coefficient, wherein the first sub-block is a sub-block of an entire transform block, wherein decoding the first significance information comprises performing a first arithmetic decoding operation on the first significance information and determining a context for the first arithmetic decoding operation based on significance information of a right neighboring sub-block of a same size as the first sub-block and a lower neighboring sub-block of the same size as the first sub-block;

decoding, by the device comprising one or more processors, second significance information, wherein the second significance information indicates if a second sub-block comprises at least one non-zero coefficient, wherein the second sub-block is a sub-block of the first sub-block, wherein decoding the second significance information comprises performing a second arithmetic decoding operation on the second significance information using the context determined for the first arithmetic coding operation, wherein the second sub-block is at least a 2×2 block in size and wherein the first sub-block is larger than the second sub-block;

decoding, by the device comprising one or more processors, third significance information, wherein the third significance information indicates if an individual coefficient of the second sub-block comprises a non-zero coefficient;

based on the first significance information, the second significance information, and the third significance information, generating a residual block;

adding the residual block to a predictive block to form a reconstructed block of video data; and outputting the reconstructed block of video data.

2. The method of claim 1, wherein the first sub-block is a 4×4 block and the second sub-block is a 2×2 sub-block.

3. The method of claim 1, further comprising:
receiving the video data at a receiver of a wireless communication device;
storing the video data in a memory of the wireless communication device; and
processing the video data on one or more processors of the wireless communication device.

4. A device for decoding video data, the device comprising:
a memory configured to store residual data associated with the video data; and
a video decoder coupled to the memory, comprising one or more processors, and configured to:
decode first significance information for transform coefficients associated with the residual data, wherein the first significance information indicates if a first sub-block comprises at least one non-zero coefficient, wherein the first sub-block is a sub-block of an entire transform block, wherein to decode the first significance information the video decoder performs a first arithmetic decoding operation on the first significance information and determines a context for the first arithmetic decoding operation based on significance information of a right neighboring sub-block of a same size as the first sub-block and a lower neighboring sub-block of the same size as the first sub-block;
decode second significance information, wherein the second significance information indicates if a second sub-block comprises at least one non-zero coefficient, wherein the second sub-block is a sub-block of the first sub-block, wherein to decode the second significance information the video decoder performs a second arithmetic decoding operation on the second significance information using the context determined for the first arithmetic coding operation, wherein the second sub-block is at least a 2×2 block in size and wherein the first sub-block is larger than the second sub-block;
decode third significance information, wherein the third significance information indicates if an individual coefficient of the second sub-block comprises a non-zero coefficient;
based on the first significance information, the second significance information, and the third significance information, generate a residual block;
add the residual block to a predictive block to form a reconstructed block of video data; and
output the reconstructed block of video data.

5. The device of claim 4, wherein the first sub-block is a 4×4 block and the second sub-block is a 2×2 sub-block.

6. The device of claim 4, wherein the device comprises at least one of:
an integrated circuit;
a microprocessor; or
a wireless communication device that includes the video decoder.

7. The device of claim 4, wherein the device comprises a wireless communication device, the device further comprising a receiver configured to receive the video data.

8. A non-transitory computer-readable storage medium storing instructions that when executed by one or more processors cause the one or more processors to:
code first significance information for transform coefficients associated with residual data, wherein the first significance information indicates if a first sub-block comprises at least one non-zero coefficient, wherein the first sub-block is a sub-block of an entire transform block, wherein to code the first significance information the instructions cause the one or more processors to perform a first arithmetic decoding operation on the first significance information and determine a context for the first arithmetic decoding operation based on significance information of a right neighboring sub-block of a same size as the first sub-block and a lower neighboring sub-block of the same size as the first sub-block;
code second significance information, wherein the second significance information indicates if a second sub-block comprises at least one non-zero coefficient, wherein the second sub-block is a sub-block of the first sub-block, wherein to decode the second significance information, the instructions cause the one or more processors to perform a second arithmetic decoding operation on the second significance information using the context determined for the first arithmetic coding operation, wherein the second sub-block is at least a 2×2 block in size and wherein the first sub-block is larger than the second sub-block;
code third significance information, wherein the third significance information indicates if an individual coefficient of the second sub-block comprises a non-zero coefficient;
based on the first significance information, the second significance information, and the third significance information, generate a residual block;
add the residual block to a predictive block to form a reconstructed block of video data; and
output the reconstructed block of video data.

9. The non-transitory computer-readable storage medium of claim 8, wherein the first sub-block is a 4×4 block and the second sub-block is a 2×2 sub-block.

10. The non-transitory computer-readable storage medium of claim 8, wherein a pattern for a context assignment is based on a position of the second sub-block within the first sub-block.

11. An apparatus for decoding video data, the apparatus comprising:
- means for decoding first significance information for transform coefficients associated with residual data, wherein the first significance information indicates if a first sub-block comprises at least one non-zero coefficient, wherein the first sub-block is a sub-block of an entire transform block, wherein the means for decoding the first significance information comprises means for performing a first arithmetic decoding operation on the first significance information and means for determining a context for the first arithmetic decoding operation based on significance information of a right neighboring sub-block of a same size as the first sub-block and a lower neighboring sub-block of the same size as the first sub-block;
- means for decoding second significance information, wherein the second significance information indicates if a second sub-block comprises at least one non-zero coefficient, wherein the second sub-block is a sub-block of the first sub-block, wherein the means for decoding the second significance information comprises means for performing an arithmetic decoding operation on the second significance information using the context determined for the first arithmetic coding operation, wherein the second sub-block is at least a 2×2 block in size and wherein the first sub-block is larger than the second sub-block; and
- means for decoding third significance information, wherein the third significance information indicates if an individual coefficient of the second sub-block comprises a non-zero coefficient;
- means for generating a residual block based on the first significance information, the second significance information, and the third significance information;
- means for adding the residual block to a predictive block to form a reconstructed block of video data; and
- means for outputting the reconstructed block of video data.

12. The apparatus of claim 11, wherein a pattern for a context assignment is based on a position of the second sub-block within the first sub-block.

13. The method of claim 3, wherein the wireless communication device comprises a telephone handset and wherein receiving the video data at the receiver of the wireless communication device comprises demodulating, according to a wireless communication standard, a signal comprising the video data.

14. The device of claim 7, wherein the wireless communication device comprises a telephone handset and wherein the receiver is configured to demodulate, according to a wireless communication standard, a signal comprising the video data.

* * * * *